Dec. 8, 1931.   H. ERNST ET AL   1,835,979
THREE-PUMP HYDRAULIC SYSTEM
Filed May 21, 1929
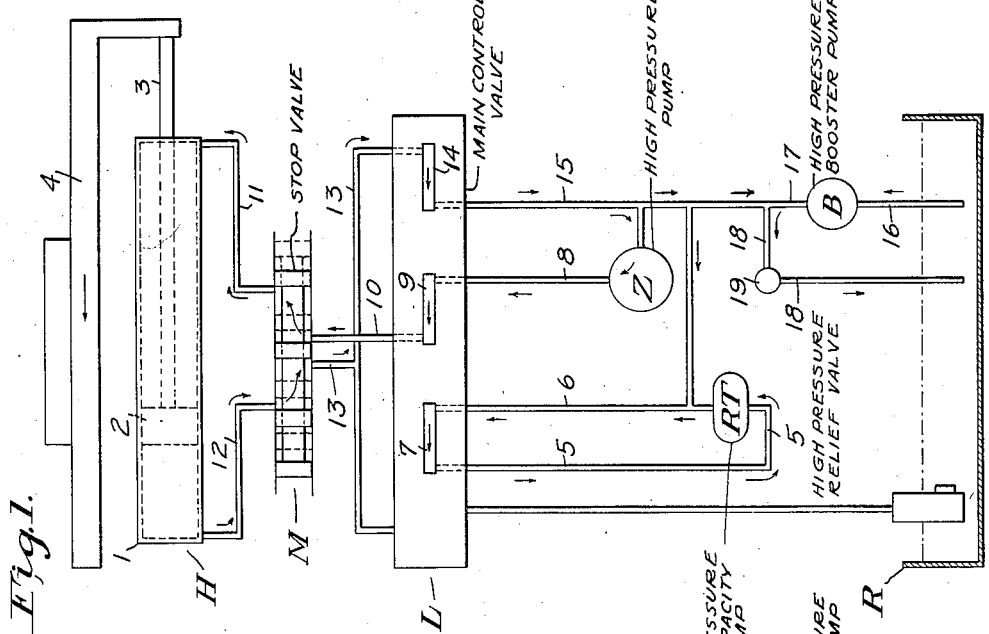
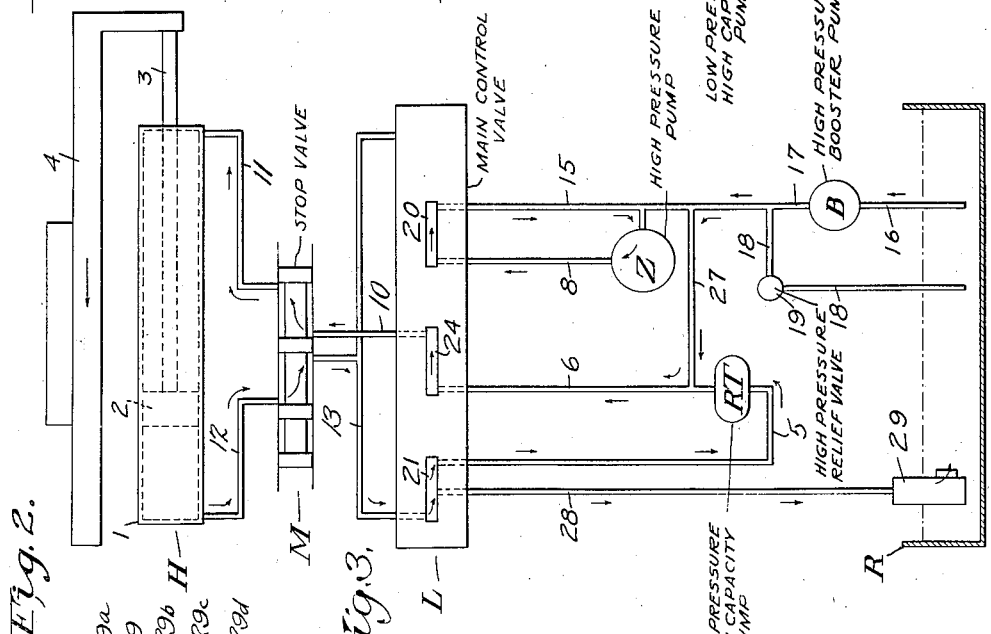
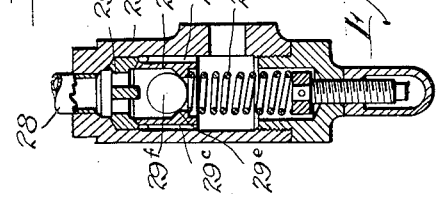
Inventors
Hans Ernst
Lester F. Nenninger
By Attorney
Nathan Bowman Patented Dec. 8, 1931

1,835,979

UNITED STATES PATENT OFFICE

HANS ERNST AND LESTER F. NENNINGER, OF CINCINNATI, OHIO, ASSIGNORS TO THE CINCINNATI MILLING MACHINE COMPANY, OF CINCINNATI, OHIO, A CORPORATION OF OHIO

THREE-PUMP HYDRAULIC SYSTEM

Application filed May 21, 1929. Serial No. 364,896.

This invention relates to hydraulic transmissions of that type which seeks to effect a uniform rate of movement of an actuated member by delivering into an hydraulic motor, at a volumetrically constant rate, what may be termed "pushing-oil".

Hydraulic systems of this nature, while not limited thereto, are particularly advantageous when utilized to actuate a reciprocatory element of a machine tool, such, for example, as the work-table of a milling machine. The invention will therefore, for convenience, be described in connection with that particular type of machine tool.

The work-table of a milling machine must, for practical operation, be translated at various times in opposite directions and at rapid and slow rates, the rapid translation being employed quickly to position the work relative to the tool prior to a machining operation, and the slow translation being utilized to feed the work past the tool during the cutting operation.

Present day milling machines are adapted to cut either "with" or "against" the feed, that is, the cutter may be so rotated that its action on the work may tend to drag the work in the direction of the feed or it may be rotated in the opposite direction with respect to the movement of the work whereby the action of the cutter on the work tends to retard the movement of the table.

To give to the table its required movements and to insure a uniform rate of travel under the varying conditions, we have heretofore provided an hydraulic system comprising a high capacity low pressure pump adapted to effect rapid traverse of the table, a relatively lower capacity high pressure pump adapted to force oil into the receiving end of the hydraulic motor to effect slow feeding movements of the piston and the table connected therewith, and a third or booster pump of relatively high pressure and lower capacity connected to the exhaust end of the motor and adapted to maintain a high back pressure therein. This system forms the subject of our pending application, Serial Number 362,414, filed May 11, 1929.

In the system disclosed in said application the amount of back pressure in the exhaust end of the motor is controlled by a high pressure relief valve through which a portion of the oil delivered by the booster pump is exhausted.

In our application Serial Number 363,230 filed May 15, 1929 there is disclosed an hydraulic system which is an improvement over that disclosed in our first mentioned application, in that, during rapid traverse movement of the work-table, the booster pump is enabled to exhaust through a relatively low-pressure relief valve, instead of through the high pressure relief valve which maintains a high back-pressure in the motor during slow feed of the table.

The system forming the subject of this application embodies all of the advantages of our two prior systems and has, in addition, the advantage that during rapid traverse movement of the table the output of the booster pump is combined with the output of the rapid traverse pump, thereby permitting the use of a smaller capacity rapid traverse pump to obtain a predetermined rate of movement of the table.

A further advantage of the present system is that it enables the high pressure relief valve, which, during slow feed of the table, serves to maintain a high back pressure in the motor, to be utilized as an emergency relief valve for the rapid traverse pump. This protects the parts against undue pressures and breakage in the event that the table should become jammed, or otherwise held against movement, while the rapid traverse pump is connected to actuate the hydraulic motor.

In the annexed drawings, forming a part of this disclosure, Figure 1 is a diagrammatic view of our improved hydraulic system, the controlling valves thereof being so set as to effect slow feeding movement of the actuated element to the left, the rate of feed being determined by the action of a variable delivery pump connected with the intake end of the hydraulic motor. Fig. 2 is a similar view with the valves set in a different position, thereby to effect a rapid traverse movement of the actuated element to the left. Fig.

3 is a longitudinal sectional view of a combined pressure-relief and check valve later to be referred to.

Referring more specifically to the drawings, the improved hydraulic system is disclosed as comprising a reservoir R adapted to contain a supply of actuating liquid, preferably oil; an hydraulic motor H, comprising a cylinder 1 and piston 2, and a plurality of pumps, valves and conduits, later to be described, connecting the reservoir and the motor. The motor is, of course, intended to do work and this may be effected by having the piston 2 connected, as by a piston rod 3, with a reciprocatory element or table 4. For the purpose of this disclosure the element 4 may be considered to be the work-table of a milling machine inasmuch as the features of this invention may be employed to advantage when embodied in that type of machine tool.

The pumps embodied in this system comprise a low pressure high capacity pump RT, adapted to effect rapid traverse movements of the reciprocatory table 4; a low capacity high pressure booster pump B adapted, during slow feeding movement of the table, to be connected to the exhaust end of the cylinder 1, to build up in said end a high resisting pressure; and a high pressure pump Z having its discharge port connected with the intake end of said cylinder and serving to inject oil thereinto at a volumetrically uniform rate. The pump Z may receive oil from any suitable source but preferably it is connected to receive oil from the exhaust end of the hydraulic motor. To enable the table to be moved at any desired uniform rate, the pump Z is preferably of the variable delivery type which, by means of adjustment, may be caused to deliver oil into the intake end of the motor at any desired volumetrically uniform rate from zero to the maximum capacity of the pump.

Intermediate the pumps RT, B and Z and the hydraulic motor H, are two valves, one, L, which serves as a selector or main control valve and the other, M, which serves as a supplemental or stop valve. The valve L is adapted to control the direction of flow of oil to and from the motor H and to determine which of the pumps RT or Z may be effective to actuate said motor. The valve M serves either to connect the motor H with the valve L, as shown in full lines in the drawings, or to isolate the motor from the valve L and the pumps, as shown in dotted lines in Fig. 1, thereby to trap the oil in the opposite ends of the motor H when it is desired to lock the table 4 against movement in either direction. The construction and operation of the valves L and M are clearly shown and described in our application, Serial Number 220,721, filed September 15, 1927 and also in British Patent No. 297,104. Detailed illustration and description thereof, in this application, is therefore deemed unnecessary.

Fig. 1 shows the valves set to effect slow feeding movement of the table 4 to the left. In this setting of the valves the rapid traverse pump RT is short circuited, drawing oil in through conduit 5 and discharging it through conduit 6, port 7, in valve L and returning it to the pump through conduit 5. Thus in this setting of the valves the rapid traverse pump has no effect upon the hydraulic motor. As shown in Fig. 1 the pump Z has its discharge port connected, by conduit 8, port 9, in valve L, conduit 10, through valve M, conduit 11 with the right end of the hydraulic motor H, thereby injecting oil thereinto and causing movement of the piston 2 and table 4 to the left. Oil in the left end of the cylinder 1 is exhausted through conduit 12, through valve M, conduit 13, port 14 in valve L, and conduit 15. Preferably the conduit 15 connects with the intake port of the variable delivery pump Z whereby oil exhausted from the left end of the cylinder is forced into the right end thereof, making, in effect, a substantially closed circuit.

As previously stated, it is desirable that a high back pressure be maintained in the exhaust end of the motor H. This is effected by means of the high pressure booster pump B which draws oil from the reservoir R through conduit 16 and discharges it through conduit 17 connected with the conduit 15. The excess oil delivered by the pump B is returned to the reservoir through a relief line 18 controlled by a high presure relief valve 19, the setting of which determines the amount of back pressure on the exhaust end of the hydraulic motor.

Fig. 2 shows the valve L set to effect rapid traverse movement of the table 4 to the left. In this setting the pump Z is short circuited, thereby effecting a continuous flow of oil through conduit 8, port 20, in the valve L and conduit 15. The high capacity rapid traverse pump RT has its intake port connected by conduit 5, port 21, in valve L, conduit 13, through valve M, and conduit 12, with the left or exhaust end of the hydraulic motor H. The discharge port of the pump RT is connected by conduit 6, port 24 in valve L, conduit 10, through valve M, and conduit 11 with the right or intake end of said motor. Thus it will be seen that a large volume of oil will be rapidly withdrawn from the left end of the cylinder 1 and forced into the right end thereof, thereby effecting a rapid movement of the piston 2 and table 4 to the left. As will be perceived from an inspection of Fig. 2 the pump B has its discharge port connected, as by means of conduits 17 and 27, with the conduit 6. Therefore during traverse of the table the oil delivered by pump B combines with the oil passed by pump RT and the combined output of the two pumps is delivered into the intake end of the motor H. It is therefore obvious that a predetermined rate of movement of the table 4 may be obtained with the use of a smaller capacity rapid traverse pump than in our prior systems in which, during the traverse of the table, the output of the pump B is exhausted back into the reservoir. The advantages obtained by the use of a smaller capacity pump are self-evident.

To compensate for the difference (due to the presence of the piston rod) between the amount of oil required to be injected into the right end of the hydraulic motor to move the piston a predetermined distance and the greater amount of oil exhausted from the left end thereof by such movement, and also to compensate for the oil delivered by the pump B, the conduit 13 is connected, through port 21, with a conduit 28, through which a portion of the oil in the left end of the motor may be exhausted into the reservoir. The lower end of this conduit is closed by a relatively low pressure spring resistance valve 29 providing a back pressure on the exhaust end of the hydraulic motor when the table is traversed to the left.

The valve 29 serves as a pressure relief valve when oil is being discharged through the conduit 28 into the reservoir and as a check valve when oil is flowing therethrough in the opposite direction as later will be described. To that end the valve includes a port 29ª normally closed by a spring pressed member 29ᵇ formed in its outer periphery with a plurality of oil passages 29ᶜ through which oil passes when sufficient pressure has been built up in the conduit to overcome the spring 29ᵈ and move the member 29ᵇ away from the port 29ª. The member 29ᵇ is formed with an aperture 29ᵉ which, during discharge of oil through the conduit 28, is closed by a ball check valve 29ᶠ. This check valve however permits ready inflow of the oil from the reservoir to the conduit 28 for a purpose later to be explained.

Although only two positions of the valve L have been shown and described, it is to be understood that it may also be shifted to two other positions which cause the system to effect respectively rapid traverse and slow feed to the right.

When the table is traversed to the right the amount of oil required to be forced into the left end of the motor, to move the piston a predetermined distance, is greater than the combined amounts exhausted from the right end of the motor and received from the pump B, therefore, during this movement, the conduit 28 serves as a supply conduit for the pump RT, permitting that pump to draw oil therethrough from the reservoir.

Referring again to Fig. 2, it will be seen that the high pressure relief valve 19 also serves as an emergency relief for the rapid traverse pump. During traverse of the table, should the table become jammed or otherwise held against movement, the pumps RT and B would continue to operate, thereby building up pressure in the intake end of the hydraulic motor and the conduits connected therewith. When this pressure reached a predetermined value, the valve 19 would open and both pumps would discharge therethrough to the reservoir, the oil from the pump RT flowing to the right through conduit 27.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

We claim:

1. An hydraulic system combining a motor; a reservoir; a first pump connected to deliver oil into the intake end of said motor to effect relatively slow actuation thereof; a high pressure low capacity pump drawing oil from said reservoir and connected, during slow actuation of said motor, with the exhaust end thereof to maintain therein a pressure counter to the pressure built up in the intake end thereof by said first pump; a third pump adapted to have its discharge conduit connected with the intake end of said motor; valve means selectively to render either the first or third pump effective to actuate said motor, said high pressure pump also having its discharge port connected with the discharge conduit of said third pump whereby the high pressure pump assists the third pump in effecting rapid actuation of the motor.

2. An hydraulic system combining a motor; a reservoir; a pump adapted to be hydraulically connected with opposite ends of said motor and to receive oil from one end thereof and inject it into the other end thereof to effect rapid actuation of said motor; a second pump drawing oil from said reservoir and injecting it into the intake end of said motor to assist the first named pump in the rapid actuation of said motor; a third pump adapted to be connected with the exhaust and intake ends of said motor to effect slow actuation of said motor; and a relief line connecting the exhaust end of said motor with said reservoir.

3. An hydraulic system combining a motor; a reservoir; a relatively low pressure pump having an intake conduit connected with the exhaust end of said motor and a discharge conduit connected with the intake end thereof, said pump being adapted to receive oil from one end of said motor and inject it into the other end thereof to effect rapid actuation of said motor; a relatively high pressure pump drawing oil from said reservoir and injecting it into the intake end of said motor to assist the first named pump in rapidly actuating said motor; a second relatively high pressure pump adapted to be connected with the opposite ends of said motor to effect slow actuation thereof; a relief line connecting the intake conduit of said low pressure pump with said reservoir; and a relatively low pressure relief valve embodied in said relief line.

4. An hydraulic system combining a motor; a reservoir; a relatively low pressure pump having an intake conduit connected with the exhaust end of said motor and a discharge conduit connected with the intake end thereof, said pump being adapted to receive oil from one end of said motor and inject it into the other end thereof to effect rapid actuation of said motor; a second pump connected to draw oil from said reservoir and inject it into the intake end of said motor to assist the first named pump in rapidly actuating said motor; a third pump, of the high pressure variety, adapted, during isolation of said first and second pumps from said motor, to be connected with the opposite ends of the motor solely to effect slow actuation thereof; and a relatively high pressure relief valve connected with the intake end of said motor.

5. An hydraulic system combining a motor; a reservoir; a relatively low pressure pump having an intake conduit connected with the exhaust end of said motor and a discharge conduit connected with the intake end thereof, said pump being adapted to receive oil from one end of said motor and inject it into the other end thereof to effect rapid actuation of said motor; a relatively high pressure pump connected to draw oil from said reservoir and discharge it into the discharge conduit of the first named pump; a second relatively high pressure pump adapted to be connected to the opposite ends of said motor to effect slow actuation thereof; a relatively low pressure relief line connected to the intake conduit of the low pressure pump; and a relatively high pressure relief line connected with the discharge conduits of both pumps.

6. An hydraulic system combining an hydraulic motor; a first pump adapted to be connected to actuate said motor at a relatively slow rate; a second pump adapted to be connected to actuate said motor at a more rapid rate; means selectively to render said pumps effective to actuate said motor; and a third pump adapted to have its discharge port connected with the exhaust end of said motor when the first named pump is effective and with the intake end thereof when said second pump is effective.

7. An hydraulic system combining an hydraulic motor, a first pump adapted to be connected to actuate said motor at a relatively slow rate; a second pump adapted to be connected to actuate said motor at a more rapid rate; means selectively to render said pumps effective to actuate said motor; a third pump adapted to have its discharge port connected with the exhaust end of said motor when the first pump is effective to actuate said motor and with the intake end of said motor when the second pump is effective; a relatively low pressure relief line connected with the exhaust end of the motor when the second pump is effective; and a relatively high pressure relief line connected with the exhaust end of the motor when the first pump is effective and with the intake end thereof when the second pump is effective.

8. An hydraulic system combining an hydraulic motor; a reservoir; a first pump adapted to be connected to actuate said motor; a second pump cooperating with the first pump to increase the rate of actuation of said motor; valve means controlling the flow of liquid to and from said motor to determine the direction of actuation of said motor; a conduit connecting the exhaust end of said motor with said reservoir and acting as an exhaust line when said motor is actuated in one direction, said conduit also being connected with the intake of the first pump and serving as a supply line from said reservoir to said first pump when the motor is actuated in the other direction.

In witness whereof, we have hereunto subscribed our names.

HANS ERNST.
LESTER F. NENNINGER.